United States Patent
Jacobs et al.

(10) Patent No.: US 10,523,495 B2
(45) Date of Patent: Dec. 31, 2019

(54) INDUSTRIAL PLANT ALARM MANAGEMENT

(71) Applicant: ABB Schweiz AG, Baden (CH)

(72) Inventors: Sam Ade Jacobs, Raleigh, NC (US); Mithun P. Acharya, Cary, NC (US); Veronika Domova, Västerås (SE); Marcel Dix, Mannheim (DE); Aldo Dagnino, Cary, NC (US); Jinendra K. Gugaliya, Bangalore (IN); Kaushik Ghosh, Bangalore (IN)

(73) Assignee: ABB Schweiz AG, Baden (CH)

( * ) Notice: Subject to any disclaimer, the term of this patent is extended or adjusted under 35 U.S.C. 154(b) by 37 days.

(21) Appl. No.: 15/822,784

(22) Filed: Nov. 27, 2017

(65) Prior Publication Data
US 2019/0165989 A1 May 30, 2019

(51) Int. Cl.
*H04L 12/24* (2006.01)
*G08B 29/18* (2006.01)
*G05B 23/02* (2006.01)

(52) U.S. Cl.
CPC ...... *H04L 41/0609* (2013.01); *G05B 23/0272* (2013.01); *G08B 29/188* (2013.01); *G08B 29/18* (2013.01); *H04L 41/0883* (2013.01)

(58) Field of Classification Search
CPC ............ H04L 41/0609; H04L 41/0883; G05B 23/0272; G08B 29/188; G08B 29/18
See application file for complete search history.

(56) References Cited

U.S. PATENT DOCUMENTS

| 5,952,569 A * | 9/1999 | Jervis ...................... E21B 44/00 73/152.01 |
| 8,890,676 B1 | 11/2014 | Heath |
| 2003/0078686 A1 | 4/2003 | Ma et al. |
| 2007/0112447 A1 * | 5/2007 | McGreevy ......... G05B 19/4183 700/83 |

(Continued)

OTHER PUBLICATIONS

S. Yen and A. Chen; An Efficient Approach to Discovering Knowledge from Large Databases; Fourth International Conference on Parallel and Distributed Information Systems, 1996; Dec. 18-20, 1996; 11 pgs.; IEEE; Miami Beach, FL, USA.

(Continued)

*Primary Examiner* — Adnan Aziz
(74) *Attorney, Agent, or Firm* — Taft Stettinius & Hollister LLP; J. Bruce Schelkopf

(57) ABSTRACT

Unique systems, methods, techniques and apparatuses of an alarm management system are disclosed herein. One exemplary embodiment is a method for monitoring an industrial plant comprising determining a sequence of alarm events for each of a plurality of time intervals including a first alarm event of a plurality of alarm events and a second alarm event of the plurality of alarm events; determining a count of the first alarm events and second alarm events; determining the alarm events exceed a support threshold value; determining a third count of a sub-sequence of the sequences of alarm events including the first alarm event followed by the second alarm event in response to determining the first count and the second count exceeds the support threshold value; determining a ratio using the first count, the second count, and the third count exceeds a display threshold value; and displaying the sub-sequence.

14 Claims, 3 Drawing Sheets

(56) References Cited

U.S. PATENT DOCUMENTS

| | | | |
|---|---|---|---|
| 2008/0300698 A1* | 12/2008 | Havekost | G06F 9/4488 700/83 |
| 2010/0156654 A1* | 6/2010 | Bullemer | G05B 23/0272 340/691.6 |
| 2010/0211192 A1 | 8/2010 | Stluka et al. | |
| 2010/0289638 A1* | 11/2010 | Borchers | G05B 23/0272 340/506 |
| 2011/0087702 A1 | 4/2011 | McGreevy et al. | |
| 2012/0199397 A1* | 8/2012 | Wessling | E21B 47/06 175/57 |
| 2013/0015967 A1 | 1/2013 | Nagathi et al. | |
| 2014/0032552 A1* | 1/2014 | Cohen | H04L 41/065 707/737 |
| 2014/0077963 A1* | 3/2014 | Dankers | E21B 41/0021 340/853.1 |
| 2014/0115002 A1* | 4/2014 | Kocher | G06F 11/3013 707/776 |
| 2014/0219107 A1 | 8/2014 | Racz et al. | |
| 2014/0292517 A1* | 10/2014 | Hu | A61B 5/00 340/573.1 |
| 2014/0361885 A1 | 12/2014 | Szudajski et al. | |
| 2015/0137968 A1* | 5/2015 | Rusin | G08B 25/001 340/506 |
| 2018/0053400 A1* | 2/2018 | Abado | G05B 23/0224 |
| 2018/0322770 A1* | 11/2018 | Srinivasan | G05B 23/0272 |

OTHER PUBLICATIONS

International Search Report and Written Opinion, PCT Appln. No. PCT/US18/62532, dated Feb. 8, 2019, 8 pgs.

\* cited by examiner

INDUSTRIAL PLANT ALARM MANAGEMENT

BACKGROUND

The present disclosure relates generally to alarm management in industrial plants. Industrial plants require monitoring systems to detect device failure and other events causing the plant operate at suboptimal efficiency. Plant monitoring systems alert system operators by displaying alarms corresponding to specific problems within the industrial plant. Complex industrial plants may monitor hundreds of alarms generating millions of alarm events. The number of alarms transmitted to system operators may increase to the extent that the alarms with high priority may not be readily distinguishable from the alarms with low priority. In such cases, a monitoring system may include an alarm management system to assist a system operator with identifying high priority alarms. Existing alarm management systems suffer from a number of shortcomings and disadvantages. There remain unmet needs including increasing plant reliability, reducing operator load, decreasing interface complexity, preventing future alarm events, and increasing plant efficiency. For instance, current monitoring systems may display all alarms, which requires a system operator to spend considerable time analyzing alarm data to identify high priority alarms. Furthermore, alarm analysis is limited to simple KPI calculations, such as alarm and event frequency, alarm priority, message distribution, alarm duration, and operator actions. There is a significant need for the unique apparatuses, methods, systems and techniques disclosed herein.

DISCLOSURE OF ILLUSTRATIVE EMBODIMENTS

For the purposes of clearly, concisely and exactly describing non-limiting exemplary embodiments of the disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the present disclosure is thereby created, and that the present disclosure includes and protects such alterations, modifications, and further applications of the exemplary embodiments as would occur to one skilled in the art with the benefit of the present disclosure.

SUMMARY

Exemplary embodiments include unique systems, methods, techniques and apparatuses for an alarm management system. Further embodiments, forms, objects, features, advantages, aspects and benefits of the disclosure shall become apparent from the following description and drawings.

DETAILED DESCRIPTION OF ILLUSTRATIVE EMBODIMENTS

Figure 1:
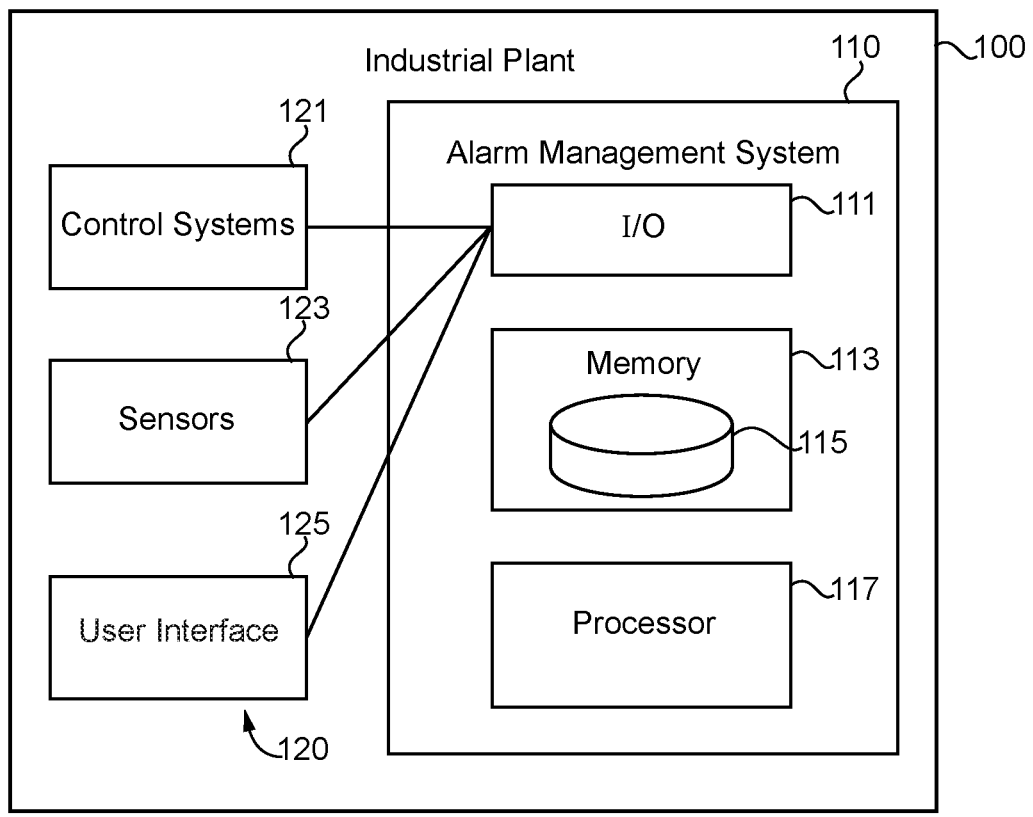
FIG. 1 is a box diagram illustrating an exemplary industrial plant.

With reference to FIG. 1 there is a box diagram illustrating an exemplary industrial plant 100 including an alarm management system (AMS) 110. It shall be appreciated that system 100 may be implemented in a variety of applications, including oil refineries, power generation stations, petrochemical facilities, and other industrial facilities, to name but a few examples.

Industrial plant 100 includes a plurality of devices 120 structured to communicate with AMS 110 including control systems 121 structured to operate machines or other devices of plant 100, sensors 123 structured to measure electrical, chemical, or other physical characteristics of plant 100, and a user interface 125. As described in more detail below, interface 125 is structured to display alarm sequences identified by AMS 110. In certain embodiments, interface 125 is structured to receive user input corresponding to plant alarms including events such as input corresponding to system operator actions. User interface 125 may include a mouse, keyboard, a touch screen display, or a computer monitor, to name but a few examples. In certain embodiments, system 100 includes a plurality of user interfaces, including one user interface structured to display alarm sequences identified by AMS 110 and another user interface to display alarms in real-time to a user, also known as a system operator.

AMS 110 is structured to receive alarm data, identify alarm sequences, and output the identified alarm sequences for alarm management optimization. AMS 110 may be a single device or a plurality of devices collectively structured to perform the functions described herein. AMS 110 includes an input/output device 111. Input/output device 111 allows AMS 110 to communicate with a plurality of external devices 120 by way of a wired or wireless communication channel. The data transferred between AMS 110 and devices 120 may be analog or digital. For example, input/output device 111 may be a network adapter, network card, interface, or a port (e.g., a USB port, serial port, parallel port, an analog port, a digital port, VGA, DVI, HDMI, FireWire, CAT 5, or any other type of port or interface) to name but a few examples. Input/output device 111 may be comprised of hardware, software, and/or firmware. Input/output device 111 may include more than one of these adapters, cards, or ports.

AMS 110 includes a memory device 113. Memory device 113 may be of one or more types, such as solid-state, electromagnetic, optical, or a combination of these forms to name but a few examples. Furthermore, memory device 113 may be volatile, nonvolatile, transitory, non-transitory or a combination of these types, and some or all of memory device 113 may be portable, such as a disk, tape, memory stick, or cartridge, to name but a few examples. In addition, memory device 113 may store data and programming instructions executable using processing device 115. Memory device 113 is structured to store an alarm data database 115 which includes historical alarm data received by input/output device 111.

AMS 110 includes a processing device 117. Processing device 117 may be of a programmable type, a dedicated, hardwired state machine, or a combination of these; and may further include multiple processors, Arithmetic-Logic Units (ALUs), Central Processing Units (CPUs), Digital Signal Processors (DSPs), to name a few examples. For forms of processing device 117 with multiple processing units, distributed, pipelined, and/or parallel processing may be utilized as appropriate. Processing device 117 may be dedicated to performance of just the operations described herein or may be utilized in one or more additional applications. In the depicted form, processing device 117 is of a programmable variety that executes algorithms and processes data in accordance with the programming instructions (such as software or firmware) stored in memory device 113. Processing device 117 may be comprised of one or more components of any type suitable to process the signals received from input/output device 111 or elsewhere, and provide desired output signals. Such components may include digital circuitry, analog circuitry, or a combination of both.

Figure 2:
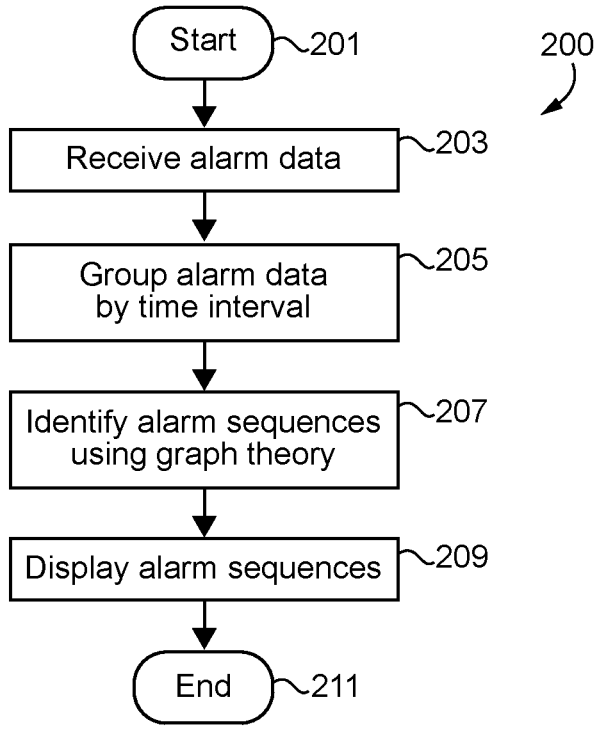
FIG. 2 is a flowchart illustrating an exemplary alarm management process.

With reference to FIG. 2 there is a flowchart illustrating an exemplary process 200 for identifying important alarm sequences. Process 200 may be implemented in whole or in part in one or more of the control systems disclosed herein. In certain forms, the alarm data collection and alarm data analysis functionalities may be performed by separate alarm management systems. In certain forms, the alarm data collection and alarm data analysis functionalities may be performed by the same alarm management system. The following description of process 200 is made with reference to AMS 110 of industrial plant 100 in FIG. 1.

Process 200 begins at start operation 201 and proceeds to operation 203 where AMS 110 receives historical alarm data for a data collection interval from the plurality of devices 120. Alarm data may include alarm identification, alarm priority information, and an alarm initialization timestamp.

Process 200 proceeds to operation 205 where AMS 110 divides the data collection interval into subintervals, also called baskets, using the timestamp associated with each alarm event. Each subinterval includes a grouping of alarms that have occurred within a user-defined time period. All subintervals may be an equal length of time, such as 20 minutes. In other embodiments, the length of each interval may be dynamically set based on an alarm rate or user selections.

Process 200 proceeds to operation 207 where AMS 110 uses graph-based analysis to evaluate the subintervals of alarm data. AMS 110 identifies all alarm sequences within each subinterval and identifies alarm sequences occurring in multiple subintervals. Alarm sequencing and analysis is performed by first generating a weighted directed graph from the alarm data received in operation 203. Each alarm is represented by a node and each transition is represented by a directed edge connecting two nodes. The graph may exclude certain transitions based on the number of times a transition occurs, also known as a support parameter. For example, any transition occurring less than two times in all subintervals may not be included in the graph. Each directed edge includes a property corresponding to the subinterval in which the associated transition appears. In certain embodiments, each edge also includes a property corresponding to the transition time between the two nodes connected to the edge. Alarm sequences are then identified by identifying sets of alarms connected by transitions. Alarm sequences may include more than two alarms if subsequent alarms in the sequence are connected to more than one transition. Alarm sequences may exclude an alarm occurring within the same subinterval as the alarm sequence, even if the excluded alarm occurred after the first alarm and before the last alarm in the alarm sequence.

As described above, identified alarm sequences must satisfy a support parameter. Alarm sequences sent to the user for analysis must also be limited to useful sequences, also known as togetherness. For example, alarm sequence A-B may have occurred 50 times in 100 subintervals, but the alarm sequences may not be important from an analysis standpoint if alarm A or alarm B occurred by itself in 30 of the 100 subintervals. Operation 207 thus analyzes the alarms sequences based on togetherness, or the ratio of the number of times individual alarms occur to the number of times the alarm sequence occurs. Togetherness ranges from 0 to 1 with 1 being that the alarms of an alarm sequence always occur in sequence. For example, if the alarm sequence A-B occurs 50 times, alarm A occurs by itself 10 times, and sequence B-A occurs 10 times, the togetherness parameter of sequence A-B would be calculated by dividing the total number of sequence occurrences (50) by the total number of sequences in which A or B occurred (50+10+10=70). Therefore, the togetherness parameter for sequence A-B is 0.71. In another example, an alarm sequence with a togetherness parameter of 1 indicates each of the individual alarm events of the alarm sequence did not occur unless the alarm sequence was observed. Alarm sequences satisfying a togetherness parameter are included in the graph. For example, alarm sequences with a togetherness of 0.5 or greater may be included in the graph.

Figure 4:
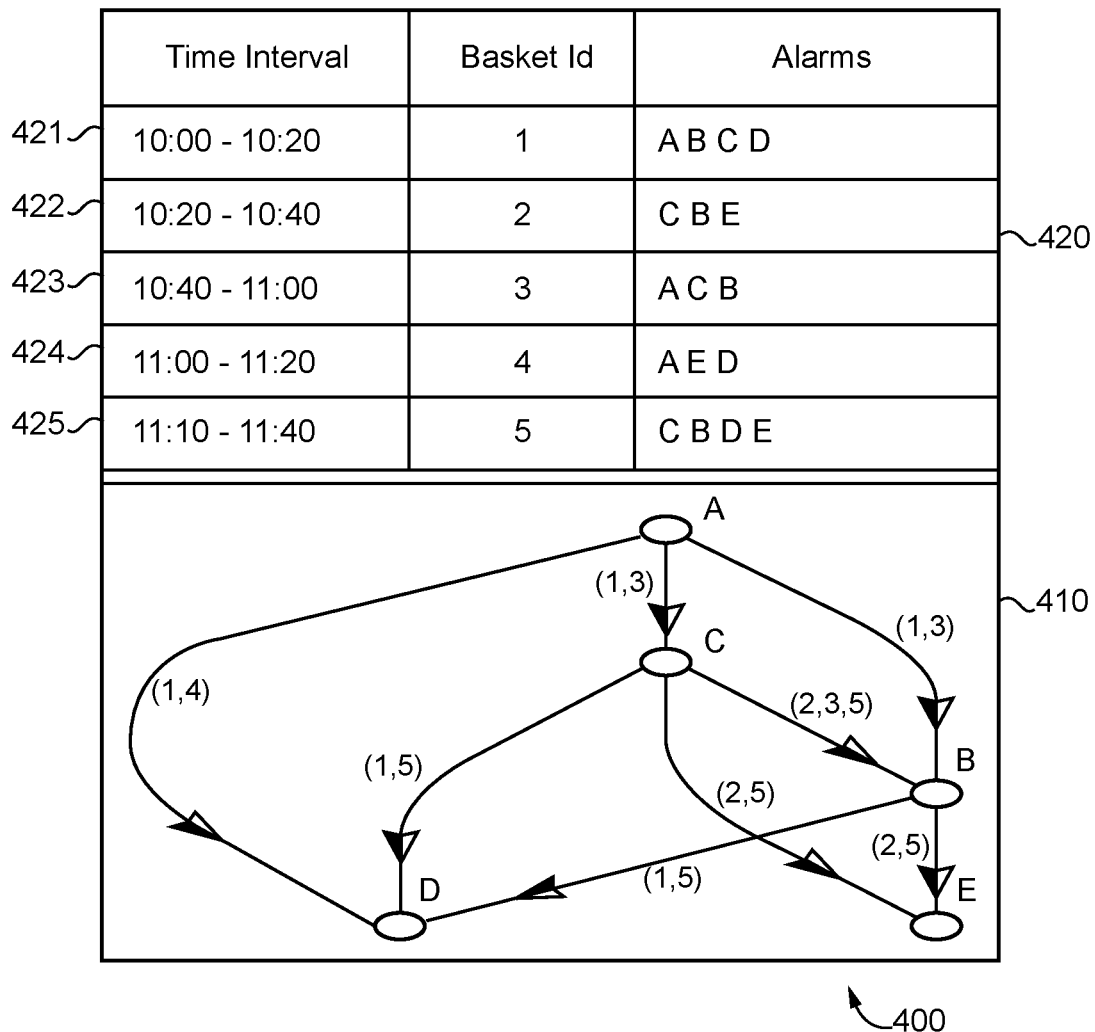
FIG. 4 is a table and graph illustrating the exemplary alarm sequence identification process.

With reference to FIG. 4 there is illustrated a graph transformation 400 generated using operation 207 of process 200. Graph transformation 400 includes a final graph 410 and a table 420 including a plurality of rows 421-425 corresponding to time intervals. Each time interval is associated with a plurality of alarm sequences that occurred during the time interval. Graph 410 is generated using the alarm sequences of table 420. Graph 410 includes a plurality of nodes, each representing one alarm, and a plurality of edges, each representing one alarm transition event. Each alarm transition event includes a property indicating the associated time interval identified graph 410 within brackets. For example, time interval 1 on row 421 includes the sequence A-B. Graph 410 thus connects node A to node B with a directed edge and adds a basket identifier to the directed edge. Graph 410 also connects each alarm to the alarms in the sequence which occur later in the sequence. For example, node A is connected to nodes B, C, and D. Any edge occurring only once is not included in graph 410. For example, sequence B-C occurs only in time interval 1, so the sequence is not included in graph 410.

With continuing reference to FIG. 2, Process 200 proceeds to operation 209 where AMS 110 displays the alarm sequences. In certain embodiments, alarm sequences satisfying a support parameter and a togetherness parameter may be used by AMS 110 to predict future alarm events. With reference to FIG. 4, if an alarm management system observes, in real-time, an alarm sequence of C-B, the system may predict alarm event E will occur soon and either alert a system operator to take remedial action or send command signals to control systems 121 to prevent or curtail damage to plant 100. In certain embodiments, alarm sequences may be used to determine undetected events. For example, if AMS 110 observes alarm event E, AMS 110 may determine alarm events C and B have already occurred.

Alarm sequences may also be used to reduce the number of alarms displayed to a system operator. For example, if one alarm sequence A-B-C-D begins to occur but only alarm D is a high priority alarm, AMS 110 may operate a user interface so as to only display alarm D to a system operator and ignore alarms A, B, and C. In another example, if sequence A-B-C-D occurs nearly simultaneously or within a short time period, AMS 110 may operate a user interface so as to only display one alarm and not display the other alarms.

In certain embodiments, partial sequence A-B-C of sequence A-B-C-D may be used to determine a root cause for D by flagging A-B-C as one potential cause of alarm D. In certain embodiments, alarm sequences are output to a user via a user interface for further analysis and implementation by the user.

Figure 3:
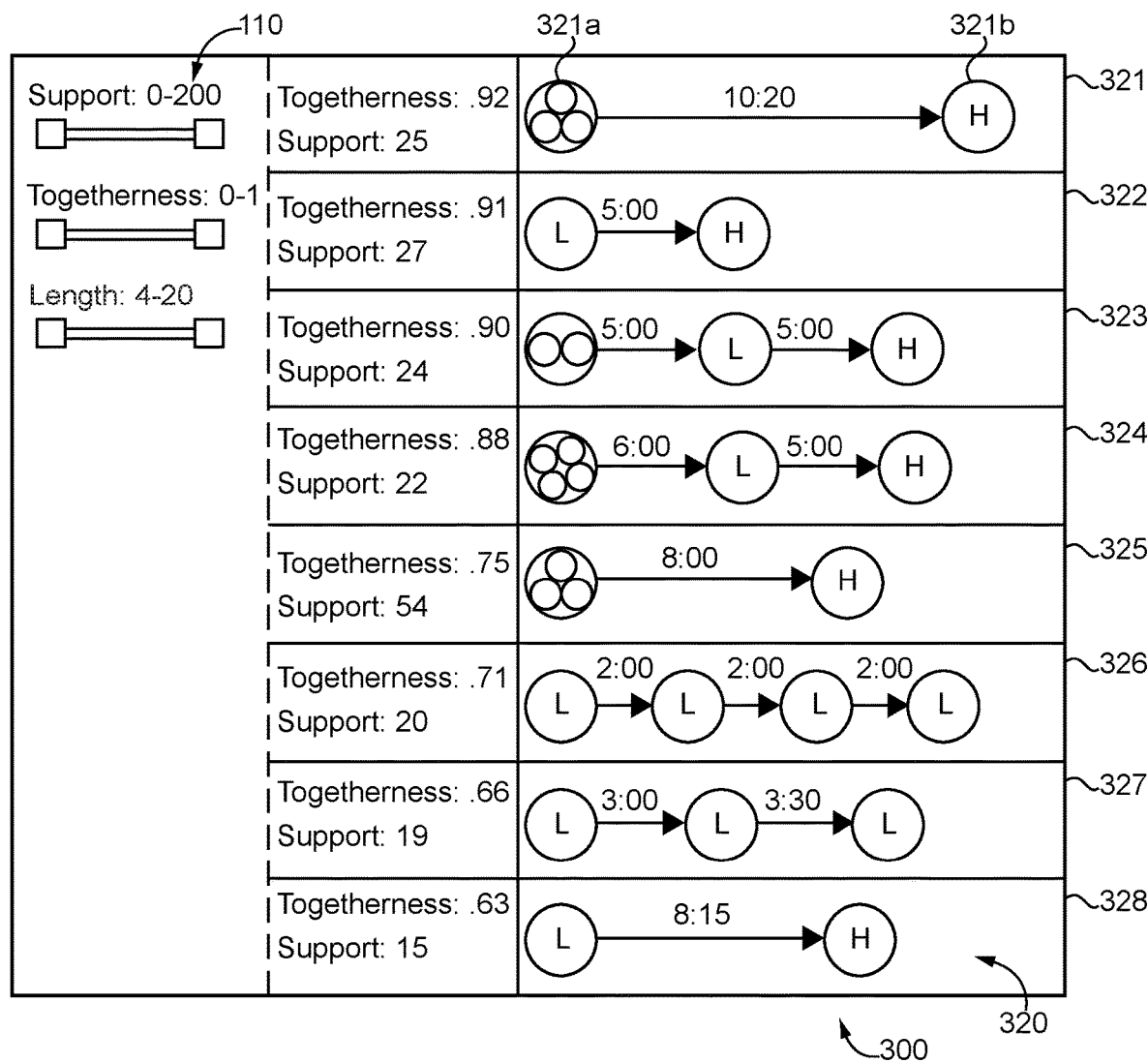
FIG. 3 illustrates a user interface for an exemplary alarm management system.

With reference to FIG. 3 there is illustrated a user interface 300 for an exemplary alarm management system, such as AMS 110 of FIG. 1. Interface 300 includes an alarm table configured to display an ordered list of alarm sequences identified using a weighted directed graph. The alarm table includes a plurality of rows 321-328. Each of the plurality of rows displays a togetherness value, a support value, and a graphic illustrating the alarm sequence. Alarms of an alarm sequence occurring within a short period of time may be represented as an alarm cluster. For example, row 321 displays an alarm sequence of alarm cluster 321a followed by alarm 321b. In the illustrated embodiment, row 321 displays the average transition time between cluster 321a and alarm 321b as 10 minutes, 20 seconds. Some alarms are labeled 'H' for high priority alarms and other alarms are labeled 'L' for low priority alarms. Alarm priority may be user-defined or one of the devices of plant 100 based on the industrial plant event corresponding to the alarm. In certain embodiments, user interface 300 may display more information regarding transition times, such as minimum, maximum, median, or standard deviation.

User interface 300 includes a user input window 310 configured to display changeable elements such as a slider bar in order to allow a user to filter the alarm sequences displayed by table 320. A user may filter the alarm sequences by support, togetherness, or sequence length, to name a few examples.

With continuing reference to FIG. 2, Process 200 proceeds from operation 209 to end operation 211. It shall be further appreciated that a number of variations and modifications to process 200 are contemplated including, for example, the omission of one or more aspects of process 200, the addition of further conditionals and operations and/or the reorganization or separation of operations and conditionals into separate processes.

Further written description of a number of exemplary embodiments shall now be provided. One embodiment is a method for monitoring an industrial automation system comprising: operating the automation system by executing a plurality of control processes with an electronic controller, each of the plurality of control processes being configured to control one or more physical elements of the automation system; determining, with the electronic controller: a sequence of alarm events for each of a plurality of time intervals during execution of the plurality of control processes using an alarm event database, one of the sequences of alarm events including a first alarm event of a plurality of alarm events and a second alarm event of the plurality of alarm events, a first count of the first alarm event, a second count of the second alarm event, whether the first count and the second count exceed a support threshold value corresponding to a minimum number of alarm event occurrences, a third count of a sub-sequence of the sequences of alarm events including the first alarm event followed by the second alarm event in response to determining the first count and the second count exceeds the support threshold value, and a ratio including the first count, the second count, and the third count exceeds a display threshold value; and displaying the sub-sequence on an operator-perceptual display using a plurality of visual alarm components to represent the first alarm event and the second alarm event.

In certain forms of the foregoing method, the method comprises measuring characteristics of the industrial automation system during the plurality of time intervals using a plurality of online sensors; and generating the alarm event database using the measurements from the plurality of online sensors, the alarm event database including the plurality of alarm events and a time stamp associated with each of the plurality of alarm events. In certain forms, the method comprises detecting the first alarm event in real-time using the plurality of online sensors; and forecasting the second alarm event using the ratio between the first count and the third count in response to detecting the first alarm event. In certain forms, the method comprises transmitting an alert to a system operator corresponding to a plant condition indicated by the second alarm event before the occurrence of the plant condition. In certain forms, determining the third count includes determining a time between the occurrence of the first alarm event and the occurrence of the second alarm event does not exceed a time threshold. In certain forms, the first count is the total number of occurrences of the first alarm event during each of the plurality of time intervals. In certain forms, one of the plurality of alarm events is an action event performed by a system operator. In certain forms, displaying the sub-sequence includes displaying statistics related to the time between the occurrence of the first alarm event and the second alarm event.

Another exemplary embodiment is an industrial plant monitoring device comprising: an input device structured to receive a set of alarm events occurring during a plurality of time intervals from an alarm event database; an output device structured to output a user interface; a processing device; and a non-transitory computer readable medium structured to store a set of instructions which when executed by the processing device are configured to: determine a sequence of alarm events for each of the plurality of time intervals using the set of alarm events, at least one of the sequence of alarm events including a first alarm event of the set of alarm events and a second alarm event of the set of alarm events, determine a first count of a first alarm event, determine a second count of a second alarm event, determine the first count and the second count exceed a support threshold value corresponding to a minimum number of alarm event occurrences, determine a third count of a sub-sequence of the sequences of alarm events including the first alarm event followed by the second alarm event in response to determining the first count and the second count exceeds the support threshold value, determine a ratio between the first count and the third count exceeds a togetherness threshold value, and display the sub-sequence with the output device.

In certain forms of the foregoing device, the first alarm event is a low priority alarm and the second alarm event is a high priority alarm and the device is configured to predict the second alarm event using the sub-sequence. In certain forms, the device is configured to transmit a command to an industrial plant control system structured to detect the first alarm event in real-time, the command configured to instruct the control signal to ignore the first alarm event and alert a system operator of a future second alarm event in response to detecting the first alarm event. In certain forms, one sequence of alarm events includes the first alarm event followed by a third alarm event followed by the second alarm event, but the subsequence does not include the third alarm event. In certain forms, the sequences of alarm events are determined using graph theory. In certain forms, the togetherness threshold value is 0.5.

A further exemplary embodiment is an industrial plant monitoring system comprising: an input device structured to receive alarm events data from a plurality of industrial plant sensors; an output device structured to output a user interface; a non-transitory computer readable medium structured to store a set of instructions; and a processing device structured to execute the set of instructions so as to: retrieve a set of alarm events corresponding to a plurality of alarm events occurring within a time interval, divide the set of alarm events data into groups corresponding to subintervals of the time interval, identify a set of alarm sequences which occurred during at least one of the subintervals, identify a first subset of the alarm sequences based on the number of times each alarm sequence occurs, identify a second subset of the alarm sequences based on the number of times each alarm sequence occurs in relation to the number of times each individual alarm of the alarm sequence occurs, and display a visual representation of the alarm sequences within both the first subset and second subset using the output device.

In certain forms of the foregoing system, one of the alarm sequences includes at least three alarm events. In certain forms, one of the alarm sequences includes at least one non-consecutive alarm event. In certain forms, the system comprises a user interface structured to receive real-time alarm event data, forecast one of the alarm sequences within both the first subset and second subset, and display an alarm event of the forecasted alarm sequence which has not yet occurred using the alarm sequence forecast. In certain forms, the set of alarm sequences, the first subset, and the second subset are identified using a weight directed graph. In certain forms, the length of each subinterval is based on the rate of alarms occurring during the time interval.

It is contemplated that the various aspects, features, processes, and operations from the various embodiments may be used in any of the other embodiments unless expressly stated to the contrary. Certain operations illustrated may be implemented by a computer executing a computer program product on a non-transient computer readable storage medium, where the computer program product includes instructions causing the computer to execute one or more of the operations, or to issue commands to other devices to execute one or more operations.

While the present disclosure has been illustrated and described in detail in the drawings and foregoing description, the same is to be considered as illustrative and not restrictive in character, it being understood that only certain exemplary embodiments have been shown and described and that all changes and modifications that come within the spirit of the present disclosure are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the present disclosure, the scope being defined by the claims that follow. In reading the claims, it is intended that when words such as "a," "an," "at least one," or "at least one portion" are used there is no intention to limit the claim to only one item unless specifically stated to the contrary in the claim. The term "of" may connote an association with or a connection to another item as well as a belonging to or a connection with the other item as informed by the context in which it is used. The terms "coupled to," "coupled with" and the like include indirect connection and coupling and further include but do not require a direct coupling or connection unless expressly indicated to the contrary. When the language "at least a portion" and/or "a portion" is used the item can include a portion and/or the entire item unless specifically stated to the contrary.

What is claimed is:

1. A method for monitoring an industrial automation system comprising:
    operating the automation system by executing a plurality of control processes with an electronic controller, each of the plurality of control processes being configured to control one or more physical elements of the automation system;
    determining, with the electronic controller:
        a sequence of alarm events for each of a plurality of time intervals during execution of the plurality of control processes using an alarm event database, one of the sequences of alarm events including a first alarm event of a plurality of alarm events and a second alarm event of the plurality of alarm events,
        a first count of the first alarm event,
        a second count of the second alarm event,
        whether the first count and the second count exceed a support threshold value corresponding to a minimum number of alarm event occurrences,
        a third count of a sub-sequence of the sequences of alarm events including the first alarm event followed by the second alarm event in response to determining the first count and the second count,
        whether the third count exceeds the support threshold value,
        a ratio of the third count to the sum of the first count, the second count, and the third count, and
        whether the ratio exceeds a display threshold value; and
    if the ratio exceeds a display threshold value, displaying the sub-sequence on an operator-perceptual display using a plurality of visual alarm components to represent the first alarm event and the second alarm event.

2. The method of claim 1 comprising:
    measuring characteristics of the industrial automation system during the plurality of time intervals using a plurality of online sensors; and
    generating the alarm event database using the measurements from the plurality of online sensors, the alarm event database including the plurality of alarm events and a time stamp associated with each of the plurality of alarm events.

3. The method of claim 2 comprising:
    detecting the first alarm event in real-time using the plurality of online sensors; and
    forecasting the second alarm event using the ratio between the first count and the third count in response to detecting the first alarm event.

4. The method of claim 3 comprising transmitting an alert to a system operator corresponding to a plant condition indicated by the second alarm event before the occurrence of the plant condition.

5. The method of claim 1 wherein determining the third count includes determining a time between the occurrence of the first alarm event and the occurrence of the second alarm event does not exceed a time threshold.

6. The method of claim 1 wherein the first count is the total number of occurrences of the first alarm event during each of the plurality of time intervals.

7. The method of claim 1 wherein one of the plurality of alarm events is an action event performed by a system operator.

8. The method of claim 1 wherein displaying the sub-sequence includes displaying statistics related to the time between the occurrence of the first alarm event and the second alarm event.

9. An industrial plant monitoring device comprising:
   an input device structured to receive a set of alarm events occurring during a plurality of time intervals from an alarm event database;
   an output device structured to output a user interface;
   a processing device; and
   a non-transitory computer readable medium structured to store a set of instructions which when executed by the processing device are configured to:
   determine a sequence of alarm events for each of the plurality of time intervals using the set of alarm events, at least one of the sequence of alarm events including a first alarm event of the set of alarm events and a second alarm event of the set of alarm events,
   determine a first count of the first alarm event,
   determine a second count of the second alarm event,
   determine whether the first count and the second count exceed a support threshold value corresponding to a minimum number of alarm event occurrences,
   determine whether a third count of a sub-sequence of the sequences of alarm events including the first alarm event followed by the second alarm event in response to determining the first count and the second count exceeds the support threshold value,
   determine a ratio of the first count and the third count;
   determine whether the ratio exceeds a togetherness threshold value, and
   display the sub-sequence with the output device.

10. The device of claim 9 wherein the first alarm event is a low priority alarm and the second alarm event is a high priority alarm and the device is configured to predict the second alarm event using the sub-sequence.

11. The device of claim 10 wherein the device is configured to transmit a command to an industrial plant control system structured to detect the first alarm event in real-time, the command configured to instruct the control signal to ignore the first alarm event and alert a system operator of a future second alarm event in response to detecting the first alarm event.

12. The device of claim 9 wherein one sequence of alarm events includes the first alarm event followed by a third alarm event followed by the second alarm event, but the subsequence does not include the third alarm event.

13. The device of claim 9 wherein the sequences of alarm events are determined using graph theory.

14. The device of claim 9 wherein the togetherness threshold value is 0.5.

* * * * *